Aug. 25, 1942. J. W. THROCKMORTON ET AL 2,294,254
APPARATUS FOR HEATING FLUIDS
Filed June 29, 1940  3 Sheets-Sheet 1
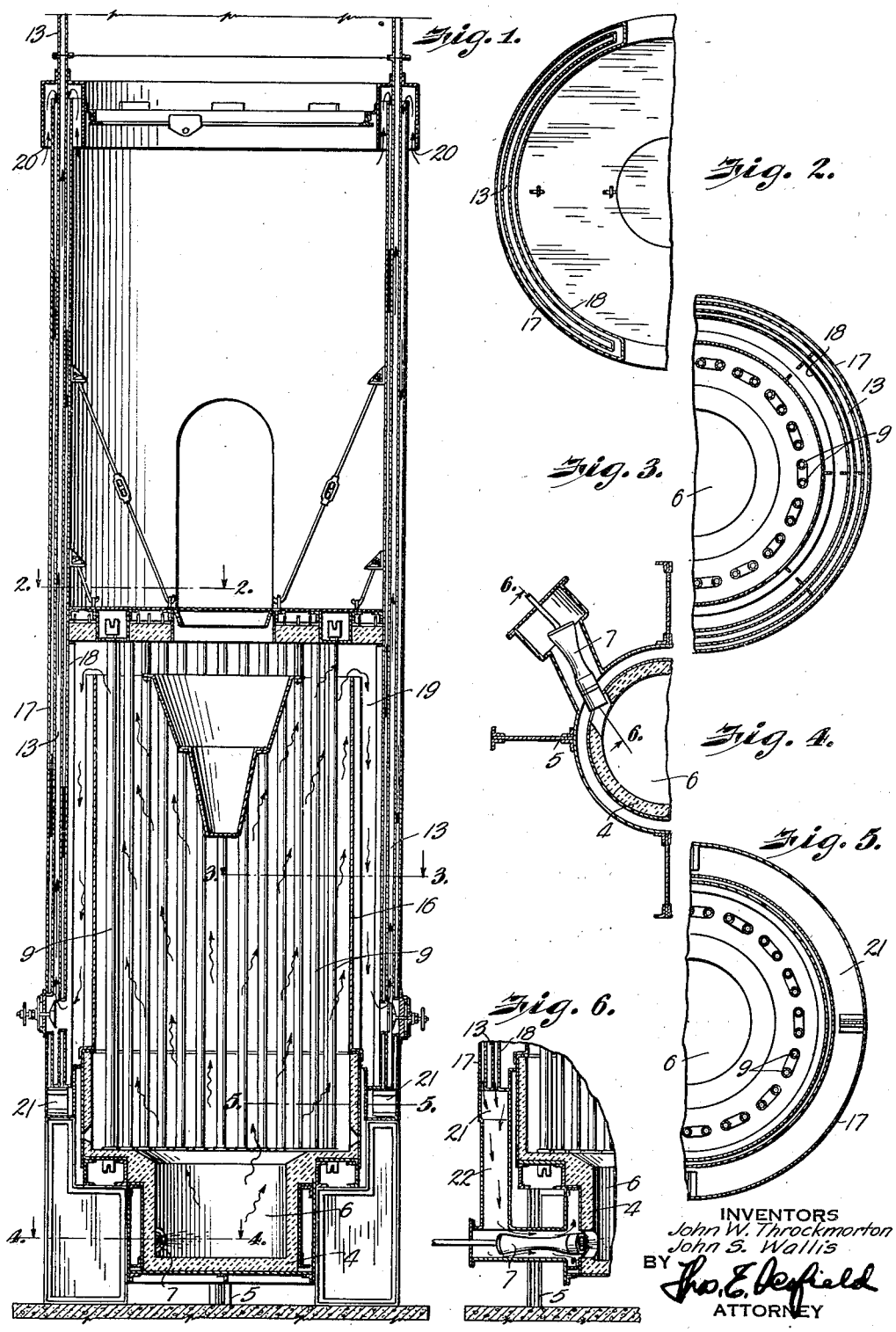
INVENTORS
John W. Throckmorton
John S. Wallis
BY
Thos. E. Oxfield
ATTORNEY

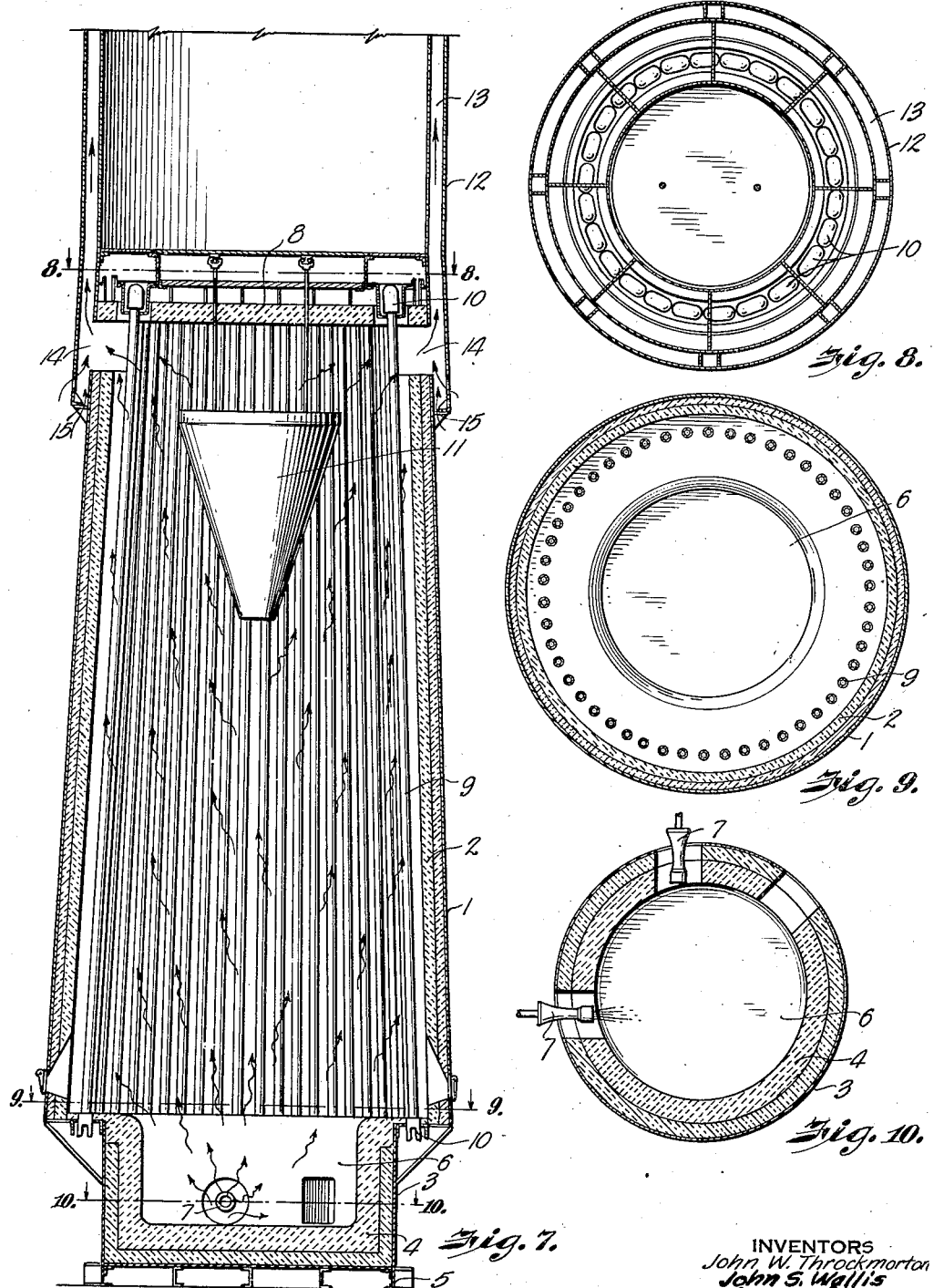

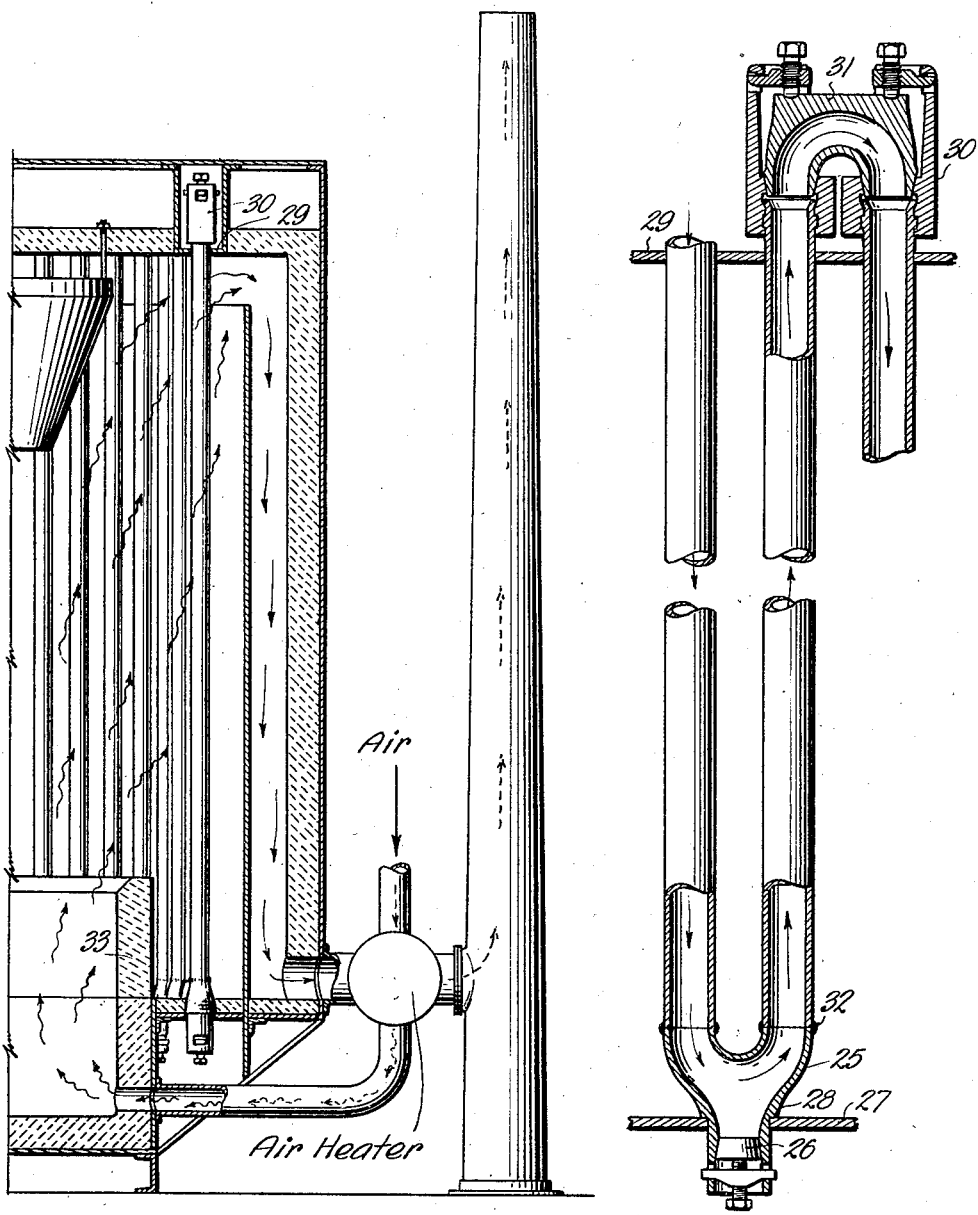

Patented Aug. 25, 1942

2,294,254

UNITED STATES PATENT OFFICE 2,294,254

APPARATUS FOR HEATING FLUIDS

John W. Throckmorton, New York, N. Y., and John S. Wallis, Darien, Conn., assignors to Petro-Chem Development Company, a corporation of Delaware Application June 29, 1940, Serial No. 343,272

2 Claims. (Cl. 122—356)

Our invention relates to an apparatus for heating fluids, and more particularly to tubular furnaces for use in petroleum and chemical industries for distillation, cracking and thermal processing of various fluids, and method of using the same. Our furnace is particularly adapted for use in the petroleum industry.

In the heating of hydrocarbon oils in the petroleum industry two types of furnaces are generally used, those designed for high efficiency where fuel oil is at a premium, and those for low efficiency where fuel has practically no value, as in the case where there are vast quantities of waste gas available for use as fuel.

Our invention is suceptible for both types of furnaces, that is, those designed for high efficiency and those designed for low efficiency where it is desired to burn excess gaseous fuel.

One object of our invention is to provide a furnace in which uniform heat intensity is delivered to all the tubes thereof.

Another object of our invention is to provide a furnace which is substantally prefabricated, thus eliminating conventional structural steel work, a large portion of the brick setting, foundations and field erection costs.

Still another object of our invention is to provide a furnace of greatly decreased weight.

A further object of our invention is to provide an embodiment thereof in which both radiant and convection heat acts on all tubes.

A still further object of our invention is to provide a furnace in which substantially uniform heat transfer rates take place throughout the entire length of all heating elements by a structure enabling an increased transfer of convection heat as the intensity of radiant heat decreases.

Still another object of our invention is to provide one embodiment thereof in which the conventional brick setting is eliminated by the use of a proper reflection material arranged to encase the furnace with an integral air heater and flue gas passage.

Still another object of our invention is to provide an arrangement in which the products of combustion are conducted behind a radiating wall around the combustion chamber thereby raising the temperature of the radiating wall surface on the cold side of the tubes and obtaining a more uniform heat absorption around the circumference of each tube.

Still another object of our invention is to provide an integral furnace, stack and air heater as a single unit with low pressure drop on the flue gas side, eliminating the necessity of forced and induced draft fans.

Still another object of our invention is to provide a furnace in which the heating elements are supported at the bottom in fixed relationship to the bottom tube sheet and free to expand through the upper tube sheet, the bottom headers located within the combustion chamber and the upper headers external of the combustion chamber.

Still another object of our invention is to provide an efficient furnace which utilizes the exit flue gas to preheat the air used for combustion and for jacketing the combustion chamber to reduce radiation losses (insulation not shown on drawings).

Other and further objects of our invention will appear from the following description.

In the accompanying drawings which form part of the instant specification and are to be read in conjunction therewith, and in which like reference numerals are used to indicate like parts in the various views;

Fig. 1 is a sectional elevation of a furnace showing one embodiment of our invention, provided with an integral air heater employed in localities where efficiency is of vital consideration.

Fig. 2 is a fragmentary sectional view taken on a line 2—2, Fig. 1.

Fig. 3 is a fragmentary sectional view taken on a line 3—3, Fig. 1.

Fig. 4 is a fragmentary sectional view taken on a line 4—4, Fig. 1.

Fig. 5 is a fragmentary sectional view taken on a line 5—5, Fig. 1.

Fig. 6 is a fragmentary sectional elevation taken on a line 6—6, Fig. 4.

Fig. 7 is a sectional elevation of a furnace showing another embodiment of our invention, of the type employed where efficiency is of no consideration.

Fig. 8 is a sectional view taken on a line 8—8, Fig. 7.

Fig. 9 is a sectonal view taken on a line 9—9, Fig. 7.

Fig. 10 is a sectional view taken on a line 10—10, Fig. 7.

Fig. 11 is a cross sectional view showing another embodiment of our invention in which the ignition chamber is provided with an upwardly extending wall to act as a baffle to prevent the overheating of the lower portions of the tubes adjacent the ignition chamber by radiant heat.

Fig. 12 is a fragmentary view showing the method of supporting the tubes from a lower tube sheet.

Referring now to Fig. 7, the furnace shell 1 is substantially cylindrical or in the form of a truncated cone and is lined with suitable refractory material 2. The lower portion of the furnace forms an ignition chamber substantially cylindrical in form and is comprised by a shell 3 lined with suitable refractory material 4, supported in any suitable manner as on a bed framework 5. The ignition chamber 6 communicates directly with the combustion chamber, extending thereabove and housed by the cylindrical or conical housing. Burners 7 usually for gaseous fuel in a furnace in which efficiency is of no consideration project tangentially into the ignition chamber 6. A roof 8 of refractory material is supported in any suitable manner. A plurality of tubular heating elements 9 are spaced symmetrically around the axis of the furnace and in the case of a setting in the form of a truncated cone, as shown in Fig. 7, the tubes at the base of the furnace are placed on wider centers than the tubes at the upper end of the furnace. It will be understood, of course, that, if desired, the setting may be made cylindrical as shown in Fig. 1, in which case the tubes would be parallel to each other. The tubes are interconnected by return bends 10 of any suitable design for continuous flow of fluid through the tube coil thus formed as is well understood by those skilled in the art.

A preferred method of our invention is to have the bottom ends of the tubes connected to a header with a single clean-out port so that the plug of the clean-out port extends below the tube sheet, the remainder of the header being within the combustion chamber. By this construction the weight of the tubes and headers is carried on the bottom tube sheet. The upper ends of the tubes pass through the upper tube sheet and are connected by return bend headers outside the combustion chamber thus providing for free upward expansion of all heating elements.

This embodiment of our invention is shown in Figs. 11 and 12, using a separate air heater with the customary flues, ducts, and stack. With this design it may or may not be necessary to use forced or induced draft fans, depending upon the pressure drop through the air heater and through the various air and flue gas passages.

Another feature of our invention giving more uniform heat absorption on the heating elements by avoiding local radiant overheating is also shown in Fig. 11. By placing a shield or baffle 33 at the lower part of the combustion chamber, being an extension of the ignition chamber, to preclude direct radiation on the tubes at the hottest section of the furnace a controlled amount of radiant heat is transmitted to the heating elements at the highest temperature zone of the combustion chamber. By this means the sections of the tubes in the hottest part of the furnace are subject to a controlled degree of radiant heat. The section of the tubes directly above the screen is subjected to direct radiation from the flame and products of combustion. The sections of the tubes opposite the radiating and deflecting cone are subjected to convection heat and a lower degree of radiant heat, and the extreme upper sections of the tubes are subjected to a high degree of convection heat and a minor degree or no radiant heat, thereby obtaining a more uniform rate of heat transfer for each section of every tube.

Fig. 12 shows a method of placing the tubes within the furnace so that all tubes are self-supporting from the base and are free to expand. The bottom ends of the tubes are connected to a header 25 having a single clean-out plug 26, so that the clean-out plug may be removed from the outer side of the bottom tube sheet 27, but the return bend remains substantially within the combustion chamber. A shoulder 28 on the return bend rests on the tube sheet and supports the heating elements and the weight of the tubes effectively seals the setting at this point against air infiltration. The upper end of the tubes pass through the tube sheet 29 and are connected by return bends 30 with a clean-out plug 31 opposite each pair of tubes and the heating elements are free to expand upwardly to compensate for varying temperatures in the structure. It will also be seen that by the removal of one plug at the base for every pair of tubes and the removal of one plug for each pair of tubes at the upper end it is possible to clean all tubes from the bridge wall platform. It is also to be noted that by placing the lower header within the combustion chamber the heating surface is slightly increased. It is also to be noted that the tubes in the bottom header, where the joint is within the combustion chamber, are welded to the header as at 32 and the tubes in the upper header consist of a rolled joint. With this construction it is also possible to break the appropriate joints at the upper header and remove a pair of tubes and the appropriate lower header, without removing the bottom tube sheet, which facilitates the making of repairs and replacements.

Adjacent the upper end of the combustion chamber proper, we suspend a radiant cone 11. A stack 12, having an annular passage 13 for the eduction of flue gases, communicates with the combustion chamber through suitable peripheral, spaced openings 14.

The products of combustion flow upward in a generally spiral direction due to the tangential position of the burners 7 and are then diverted by means of the radiating cone 11. They flow outwardly through the peripheral openings 14 and through the annular space 13 of the stack 12. The fluid to be heated passes through the heating elements 9. The intermediate portions of these heating elements, that is, those portions adjacent the radiating cone 11 are subjected to the normal radiant heat for the combustion zone and the radiant heat from the radiating zone as well. Besides this, these intermediate portions of the heating elements are subjected to considerable convection heat due to the restriction of the flue gas passage by the radiating cone 11. The extreme upper sections of the heating elements 9 are subjected chiefly to convection heat and little radiant heat.

It will be noted further that the entire heating surface will have substantially a uniform rate of heat absorption. The lower zone is subjected chiefly to radiant heat with little or no convection heat. The middle zone is subjected to a lower rate of radiant heat and to more convection heat, while the upper zone is subjected to substantially no radiant heat but to a high degree of convection heat, thus giving substantially uniform heat absoption over the entire heating surface. This uniformity of heat transfer will occur with the tubes in vertical position, as shown in Fig. 1. The inclining of the tubes, as shown in Fig. 7, furthers the uniformity of heat absorption. The portions of the tubes located adjacent the ignition chamber are on a circle of greatest diameter and hence more widely spaced in the region of greatest radiant heat intensity. As the radiant heat intensity becomes less toward the upper and cooler end of the furnace, the cross sectional area of the combustion chamber is decreased not only by the conical shape of the setting but also by the radiating cone 11. This decrease in the cross sectional area of the combustion chamber, together with the progressively closer tube spacing, increases the rate of convection heat transfer as the degree of radiant heat decreases. Furthermore, as the combustion gases lose some of their heat by heat transfer, the rate of heat absorption is maintained by an increase in the velocity of flow of the combustion gases due to the decrease in the cross sectional area of the combustion space. We have found, in some instances, that, by proper inclination of the tubes, the re-radiating surface represented by the radiating cone 11 may not be required.

A circumferential inlet 15 is provided adjacent the base of the annular stack for the admission of air. This air serves two purposes; first, flue gas entering the stack may be of a temperature as low as 800° F. or as high as 1600° or 1700° F. The dilution of these high temperature gases with cool air will enable us to use a stack of carbon steel, without the customary brick lining. Secondly, if, due to local conditions, a high stack is required, the draft will be in excess of the furnace requirements. The circumferential inlet in such case provides a means for controlling the draft in accordance with the stack height.

By disposing of burners tangential in the ignition chamber below the combustion chamber, we are enabled to vary the type of flame and the amount of radiant and convection heat at the lower ends of the heating elements and thus further control the uniformity of heat absorption.

Referring now to Fig. 1, we have shown a furnace in which efficiency is of primary consideration. Instead of the usual setting, we provide a cylindrical reflective baffle 16 defining the combustion chamber in which the heating elements 9 are placed. It will be observed that the heating elements are placed around the locus of a cylinder. It will be understood, of course, that, if desired, these elements may be placed around the locus of a truncated cone as shown in Fig. 7. The furnace shown in Fig. 1 is provided with an integral air heater and flue gas passage. The annular stack passage 13 is extended downwardly into a second annular passage formed by walls 17 and 18. The flue gases pass downwardly through passage 19 formed by the exterior of baffle 16 and the wall 18 and then upwardly through the annular stack passage 13. Air flows into the annular opening 20 and downwardly on both sides of the annular stack passage 13, preheating the air by heat exchange with the hot flue gases. The preheated air flows into a plenum chamber 21 and thence through duct 22 (shown in Fig. 6) to furnish air for the combustion fuel consumed by burner 7. The flow of products of combustion out of the stack induces the inward flow of the air.

Referring to Fig. 3, it is to be noted that we may have the air heater surround only the annular stack, instead of around both the stack and combustion chamber, depending upon the amount of surface required for preheating the air and the temperature of the exit flue gas. Furthermore, we may have the air heater around the stack only and not extend below the roof arch and carry the air from this point to the burners by means of separate ducts.

It will be noted, as in the case in Fig. 6, that a substantially uniform rate of heat absorption is obtained on all tubes by the utilization of various intensities of radiant and convection heat. It will be noted that the products of combustion in flowing down the annular passage 19 will heat the cylindrical baffle 16. The baffle may be made of a suitable alloy and we may employ a close tube spacing and operate the furnace at a bridge wall temperature of 1500° F. or higher. Due to the close spacing of the tubes, the inner surface of the cylindrical alloy baffle 16 will be at a temperature of approximately 1000° F. The passing of exit flue gas at the high temperature of 1500° F. through the annular passage 19 will increase the temperature of the inner face of the baffle 16, thus supplying more radiant heat to the back of the tubes and further giving a more uniform rate of heat transfer around the entire circumference of each heating element. It will be further noted that any heat which is transferred to the air heater by heat exchange is introduced into the ignition chamber or returned to the furnace in the form of radiant heat. The particular construction of the air heating arrangement is such that practically all refractories except the roof refractories have been eliminated.

In the embodiment in Figs. 11 and 12 is shown a construction in which a low screen wall is used in the lower part of the furnace to reduce the radiant heat which is directed upon the lower portion of the tubes. This wall may be either solid or checker-work brick and serves to screen the tubes from excessive radiant heat at the point of maximum flame intensity. By use of this screen wall there is an improved distribution of the radiant heat throughout the length of the tubes.

It will be further noted that our design avoids twisting inter-connecting ducts between the stack, furnace and air heater, giving a low pressure drop which eliminates the necessity for forced draft fans or induced draft devices and their accompanying equipment.

It will be further observed that substantially complete shop fabrication and assembly may be resorted to, thus eliminating foundations, erection costs, and considerable weight.

It will be seen that we have accomplished the objects of our invention. We have provided a tubular heating furnace which is particularly adapted for use in petroleum and chemical industries for distillation, cracking and the heating of various fluids in which substantially uniform heat transfer rates are provided throughout the entire length of all heating elements. We have provided a furnace in which increased convection heat is transferred as the intensity of radiant heat transfer decreases. We have provided a furnace without the conventional convection section but one in which radiant and convection heat act on all tubes. We have provided an embodiment of our invention in which a conventional brick setting is eliminated by encasing the furnace with an integral air heater and flue gas passages. We have provided means for maintaining a high combustion wall temperature, thus increasing the amount of radiant heat absorption by the heating elements. We have provided a tubular furnace which will enable the elimination of conventional structural steel work, brick setting, foundations and field erection costs. We have provided a furnace which is considerably lighter in weight for a given capacity of heat transfer than was known to the prior art.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. In a furnace a combustion chamber, a plurality of substantially vertically disposed heat exchange tubes positioned in said chamber, said tubes having upper and lower ends, means for burning fuel within said combustion chamber, a flue and means for providing communication between said flue and said combustion chamber, a lower tube sheet, return bend headers for said tubes, each of said return bend headers being formed with a shoulder, said shoulder being disposed above said tube sheet and adapted to support the weight of the tubes secured thereto, an upper tube sheet, the upper end of said tubes extending through said upper tube sheet and being free to expand and contract relative thereto with variations of temperature.

2. In a furnace, a combustion chamber of circular cross section, a plurality of substantially vertically disposed heat exchange tubes positioned within said chamber, said tubes extending the entire length thereof and positioned adjacent the internal wall surface, the upper ends of said tubes arranged within a circle of smaller diameter than the lower ends of said tubes, and a conical shaped baffle in the upper section of the combustion chamber forming an annular restricted passageway with the combustion chamber wall.

JOHN S. WALLIS.
JOHN W. THROCKMORTON.